Aug. 18, 1936.   F. D. HANSEN ET AL   2,051,082
METAL COVER FOR AUTOMOBILE TIRES
Original Filed July 15, 1929   2 Sheets-Sheet 2
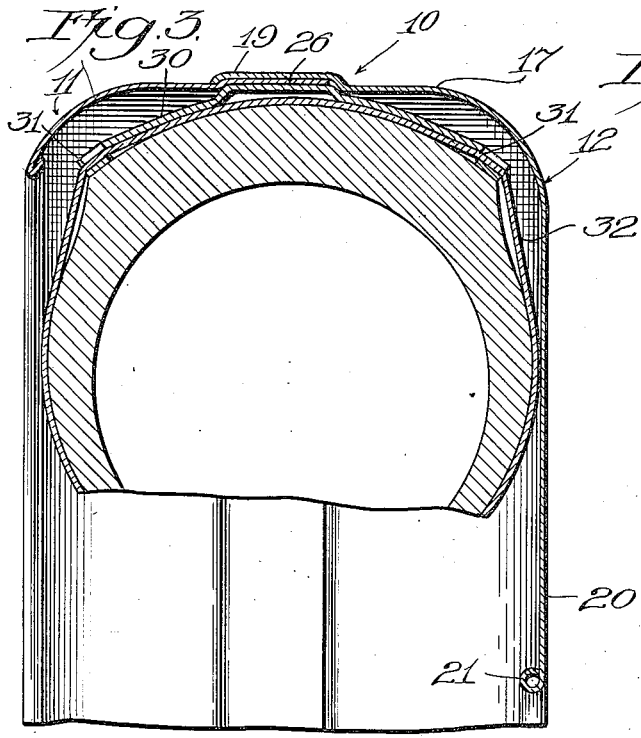
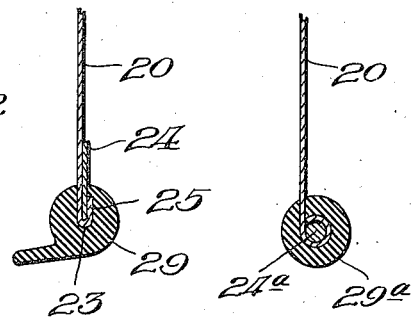
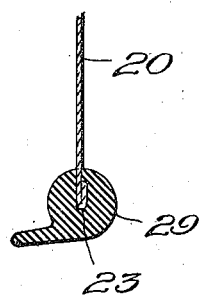
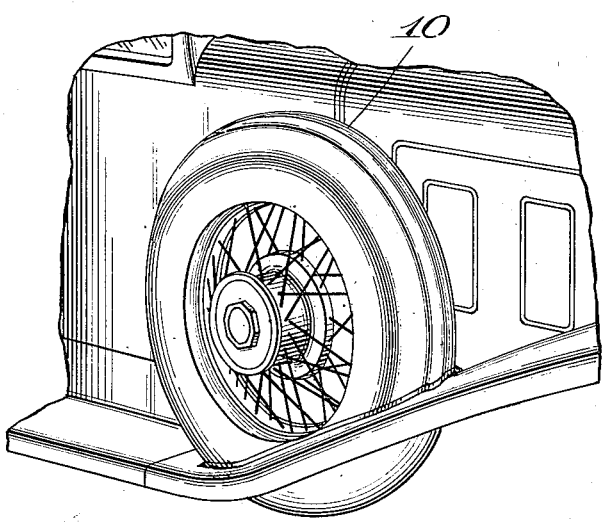
Inventors:
Frederick D. Hansen
and Herbert N. Tinker
by Rector, Hibben, Davis & Macauley Attys Patented Aug. 18, 1936

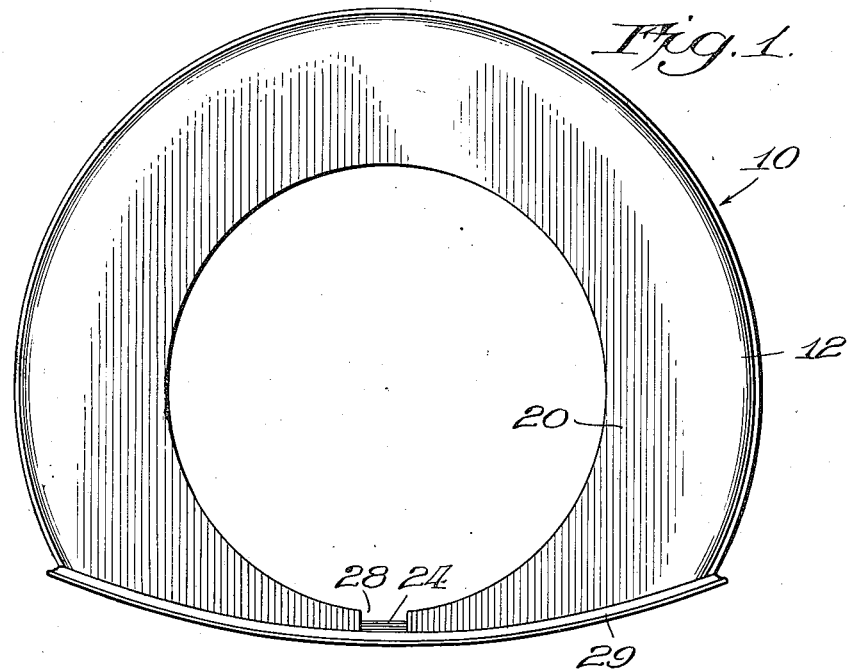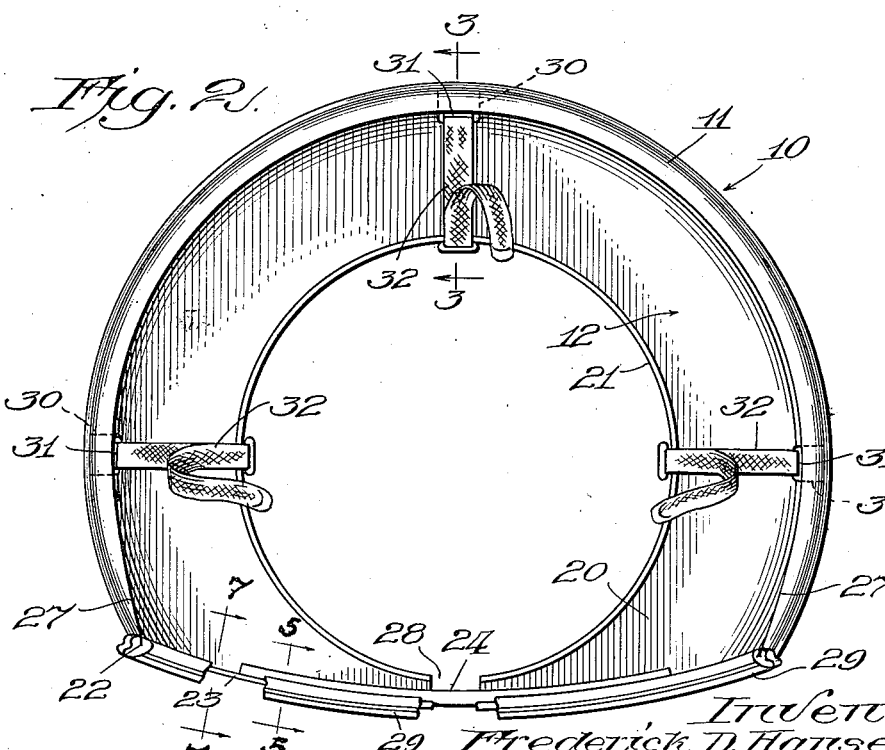

2,051,082

UNITED STATES PATENT OFFICE 2,051,082

METAL COVER FOR AUTOMOBILE TIRES

Frederick D. Hansen and Herbert W. Tinker, Milwaukee, Wis., assignors, by mesne assignments, to Lyon Incorporated, Detroit, Mich., a corporation of Delaware Original application July 15, 1929, Serial No. 378,309, now Patent No. 1,937,114, dated November 28, 1933. Divided and this application July 18, 1930, Serial No. 468,886

6 Claims. (Cl. 150—54)

Our invention relates to metal covers for automobile tires.

The principal object of our invention is to provide a cover of the non-flexible type for encasing the spare tires of motor vehicles, which is characterized by ease of handling, both in application to and in removing from a tire, an attractive appearance and a simplicity of construction.

Our invention is intended generally as a substitute for the flexible cover of waterproof material now in common use as a protective device for spare tires and is concerned more particularly with a metallic casing. As a matter of appearance, it is highly desirable to approximate closely the dual curvature of a tire, which operative requirements render impractical the production of a metallic casing from a single piece of material. Due to the necessity of bending the metal, both around the circumferential profile and inwardly in the direction of the axis of the tire to conform to the transverse tread profile thereof, a smooth, undistorted bending could hardly be achieved without providing one edge with a plurality of notches, a solution which obviously would detract from the appearance of the finished article and entail difficult manufacturing operations.

Accordingly, it is one of the expressed objects of the invention to provide a metal tire cover having a portion curved circumferentially and transversely to conform substantially to the tread of the tire and another portion adapted to form a side shield, the cover constituting two pieces having marginal overlapping ribs permanently secured together by concealed means.

Another object of our invention is to construct the metal tire cover for use on a tire mounted on or adjacent a fender or running board of an automobile, so that the cover may be removed first without the tire. More particularly the lower portion of the cover and the lower edge is shaped to conform to that of the running board or fender.

This application is a divisional of our copending application Serial No. 378,309 filed July 15, 1929 and patented Nov. 28, 1933, No. 1,937,114.

The above objects of our invention will be set forth in the following specification, reference being had to the accompanying drawings, and the novel means by which said objects are effectuated will be definitely pointed out in the claims.

In the drawings:

Figures 1 and 2 are front and rear elevations, respectively, of our improved tire cover;

Fig. 3 is a section along the line 3—3 of Fig 2;

Fig. 4 is a perspective view, illustrating the tire cover applied to a tire on an automobile;

Figs. 5 and 7 are sections along the lines 5—5 and 7—7, respectively, in Fig. 2;

Fig. 6 illustrates a modification of the structure shown in Fig. 5.

The numeral 10 designates our improved tire cover which is preferably formed of metal and composed of two parts 11 and 12, see Fig. 3, appropriately shaped and united as hereinafter described. The part 11 is formed according to the degrees of transverse and circumferential curvatures required. It is provided with a ridge 26 along its outer edge.

The part 12 of the cover is rolled and bent from a separate sheet according to the degree of circumferential curvature required and also to the degree of transverse tread curvature required, as indicated by the numeral 17 in Fig. 3. The peripheral portion 17 is provided with an offset ridge portion 19 extending along the edge thereof for its full length. The part 12 of the cover also forms an annular shield 20 which extends inwardly from the portion 17 and is curled along the inner edge thereof, as at 21, to present a finished appearance.

As pointed out in our parent application it would be impractical from a production standpoint, if not impossible, to form a metal tire cover of this dual curvature from a single piece of metal, but that it is a relatively simple matter to form the two parts separately as disclosed in that application.

The general profile of the cover, as shown in Figs. 1 and 2, is generally parti-circular, the lower edge of the cover being defined by the end edges 22 and 23 of the parts 11 and 12, respectively, which together are shaped to conform to the running board or fender of a vehicle.

The parts 11 and 12 of the cover having been formed as above described, they are united by placing the ridge 19 of the part 12 in overlapping relation to the ridge 26 of the part 11. The parts 11 and 12 will then be permanently secured together by concealed means in any approved manner, but preferably by spot welding. The overlapping ribs not only form an artistic molding extending around the cover, but also serve as a neat concealed joint between the two parts, the spot-welded points being also concealed and nonprotruding.

In order to suitably strengthen the lower portion of the cover along the edge 23, but at the same time to permit of a slight yielding movement for a purpose hereinafter explained, a reenforcing member 24, preferably in the form of a flat metal strip, is secured within a portion of the edge 23 which is curled as at 25 (Fig. 5), said strip bridging the gap 28. The strip 24 may be spot welded to the part 12.

The remaining length of the edge 23 and also the edge 22 of the part 11 may be simply folded back as shown in Fig. 7. A rubber cushion strip 29 encloses the edges 22 and 23 throughout the length thereof.

If desired, the reenforcing member may be simply a wire 24a, see Fig. 6, around which the edges 22 and 23 may be curled or rolled. The cushion strip 29a may be round in cross-section as shown in Fig. 6.

As a means of securing the tire cover to the tire, we preferably employ the arrangement shown in Figs. 2 and 3 which is fully described and claimed in the copending application of Herman Hartel, filed June 20, 1929, Serial No. 372,283. This arrangement consists of a plurality of strap brackets disposed in spaced relation around the inner periphery of the cover, each bracket being formed of a flexible strip 30 extending transversely of the tire tread and secured at its mid-portion to provide a pair of movable end portions thereof. Suitable openings 31 are cut in each end of the strip 30 and a strap 32 is looped through said openings across said strip for attachment around the section 33 of a tire.

In applying our improved tire cover to a tire, it will be apparent that the same may be bodily moved into position, which action is facilitated by the slightly flaring shape of the part 11 adjacent the end edges 22, as indicated by the numeral 27 in Fig. 2, and also by the slightly flexible nature of the lower portion of the cover. The covering having been so placed in position, the straps are then secured around the tire and are completely concealed by the annular shield 20, thus enhancing the general appearance of the cover.

For the purpose of illustration, we have described a cover which is shaped for attachment to a tire carried in a well on the running board or fender of a vehicle, but it will be understood that the application of the invention is not so limited, for it may be also utilized for tires carried in other locations. It will be understood that while we have shown one set of elements and combinations thereof for effectuating our improved tire cover and the method of making the same, the same is intended for purpose of illustration only and in nowise to restrict our article to the exact forms and structures shown, for changes may be made therein without departing from the spirit of our invention.

We claim:

1. A tire cover of metal having a circumferential portion and a front shield with a central opening, the lower edge of the shield and circumferential portion being shaped to conform to the curvature of the fender of the vehicle and its shield having a radial gap at the mid-portion of the edge, and a reenforcing member secured to said edge and bridging said gap.

2. A tire cover of metal having a circumferential portion and a front shield with a central opening, the lower edge of the shield and circumferential portion being shaped to conform to the curvature of the fender of a vehicle, the shield having a radial gap at the mid-portion of its edge, a reenforcing member secured to said edge and bridging said gap, and a cushion strip having a groove fitting over said edge.

3. A tire cover of metal shaped generally to the degrees of circumferential and transverse tread curvatures of a tire with the inner edge of the cover having a smaller radius than the radius of the tire, said cover having a parti-circular profile in front elevation and having a tread covering portion extending only part way, but more than one-half, around the circumference of the tire defining an edge for contacting with the running board or fender of a vehicle, and the inner portion of said tread covering portion being slightly flared adjacent said edge for facilitating application of the cover to a tire by a composite axial and downward movement.

4. A protective metallic cover for a spare tire on a vehicle, said cover comprising an arcuate plate for covering substantially the entire exposed outer side wall of the tire and a parti-circular rim portion at the upper part of the plate for covering only a portion of the entire outer periphery of the tire and having its lower edges terminating in said side plate, said rim portion comprising parti-circular sections each formed to extend over substantially one-half the transverse extent of the tread of the spare tire, and a peripheral reinforcing bead comprising secured overlapped raised margins of said sections at substantially the median plane of the tire when the cover is in proper tire protecting position, and means including said bead for maintaining the cover in proper tire protecting position.

5. In combination with an automotive vehicle fender having a well for receiving the lower part of a spare tire, a tire cover of form-retaining material such as sheet metal having a circumferential portion and a front shield, the lower edge of the shield and said circumferential portion being shaped to conform to the curvature of the fender adjacent the well thereof, and a cushion strip secured to said edge and engageable with the fender when the cover is in proper tire protecting position, to prevent rattling between the cover and the fender, said shield having a gap at the mid-portion of its edge, and means secured to said edge and bridging said gap to reinforce said shield.

6. A tire cover of form-retaining material such as sheet metal having a circumferential portion and a front shield of substantially arcuate form longitudinally, the lower edge of the shield and circumferential portion being shaped to conform to the curvature of the vehicle fender adapted to receive the tire, said shield having a substantially radial gap at the mid-portion of the edge, and a reinforcing member secured to said edge and bridging said gap.

FREDERICK D. HANSEN.
HERBERT W. TINKER.